(12) United States Patent
Wong

(10) Patent No.: US 7,571,490 B2
(45) Date of Patent: Aug. 4, 2009

(54) METHOD AND APPARATUS FOR PROTECTING DATA FROM UNAUTHORIZED MODIFICATION

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 880 days.

(21) Appl. No.: 10/979,691

(22) Filed: Nov. 1, 2004

(65) Prior Publication Data

US 2006/0095791 A1 May 4, 2006

(51) Int. Cl.
G06F 7/04 (2006.01)
H04K 1/00 (2006.01)
G06F 17/00 (2006.01)

(52) U.S. Cl. .............................. 726/30; 705/57; 707/100
(58) Field of Classification Search ................. 713/189; 726/30; 705/57; 707/100
See application file for complete search history.

(56) References Cited

U.S. PATENT DOCUMENTS

| | | | | | |
|---|---|---|---|---|---|
| 5,177,789 | A | * | 1/1993 | Covert | 713/184 |
| 5,963,642 | A | * | 10/1999 | Goldstein | 713/193 |
| 6,581,106 | B1 | * | 6/2003 | Crescenzi et al. | 709/242 |
| 6,725,240 | B1 | * | 4/2004 | Asad et al. | 707/202 |
| 7,093,137 | B1 | * | 8/2006 | Sato et al. | 713/193 |
| 7,142,670 | B2 | * | 11/2006 | Chari et al. | 380/28 |
| 7,266,699 | B2 | * | 9/2007 | Newman et al. | 713/182 |
| 2001/0010078 | A1 | * | 7/2001 | Moskowitz | 713/176 |
| 2002/0049738 | A1 | * | 4/2002 | Epstein | 707/1 |
| 2003/0123671 | A1 | * | 7/2003 | He et al. | 380/282 |
| 2003/0235304 | A1 | * | 12/2003 | Evans et al. | 380/216 |
| 2004/0054895 | A1 | * | 3/2004 | Barnes et al. | 713/167 |
| 2004/0184602 | A1 | * | 9/2004 | Nadehara | 380/28 |
| 2004/0250098 | A1 | * | 12/2004 | Licis | 713/193 |
| 2005/0076210 | A1 | * | 4/2005 | Thomas et al. | 713/165 |
| 2006/0041533 | A1 | * | 2/2006 | Koyfman | 707/3 |
| 2006/0053112 | A1 | * | 3/2006 | Chitkara et al. | 707/9 |
| 2006/0129847 | A1 | * | 6/2006 | Pitsos | 713/193 |

\* cited by examiner

*Primary Examiner*—Emmanuel L Moise
*Assistant Examiner*—Techane J Gergiso
(74) *Attorney, Agent, or Firm*—Park, Vaughan & Fleming LLP; Shun Yao

(57) ABSTRACT

One embodiment of the present invention provides a system that protects data from unauthorized modification in a table, wherein the table contains one or more rows, and wherein each row contains one or more columns. During operation, the system chooses in a row one or more columns to be protected. The system then produces an encrypted value for the row based on the data stored in the chosen columns. Next, the system stores the encrypted value in a column which cannot be easily modified. In this way, a later-produced encrypted value generated from the values in the protected columns can be compared against the previously stored encrypted value to verify the integrity of the data stored in the protected columns.

15 Claims, 5 Drawing Sheets

METHOD AND APPARATUS FOR PROTECTING DATA FROM UNAUTHORIZED MODIFICATION

BACKGROUND

1. Field of the Invention

The present invention relates to database security. More specifically, the present invention relates to a method and an apparatus for protecting data within a database table from unauthorized modification.

2. Related Art

As computer systems store ever-larger amounts of sensitive data, it is becoming increasingly important to protect this sensitive data from unauthorized accesses. This is an important problem. The global costs incurred from such database security breaches run to billions of dollars annually, and the cost to individual companies can be severe, sometimes catastrophic.

One of the major challenges in providing database security is to protect data from unauthorized modification. To protect data from unauthorized modification, database systems can encrypt sensitive data items. However, encrypting sensitive data items can be ineffective against administrative users who have access to the encryption key. Furthermore, a database typically stores data on some form of updatable media, such as a hard drive. An intruder having access to the hard drive and to the encryption key (e.g., a database administrator) can potentially modify the data stored on the hard drive, and can fool the database into thinking the data is authentic. Simply encrypting the data that is stored in a database does not solve this problem, because the intruder can replace the original encrypted data with his own encrypted data, using the same encryption key.

Hence, what is needed is a method and an apparatus for effectively protecting data in a database from unauthorized modification, especially against intruders with administrative privileges.

SUMMARY

One embodiment of the present invention provides a system that protects data from unauthorized modification in a table, wherein the table contains one or more rows, and wherein each row contains one or more columns. During operation, the system chooses in a row one or more columns to be protected. The system then produces an encrypted value for the row based on the data stored in the chosen columns. Next, the system stores the encrypted value in a column which cannot be easily modified. In this way, a later-produced encrypted value generated from the values in the protected columns can be compared against the previously stored encrypted value to verify the integrity of the data stored in the protected columns.

In a variation on this embodiment, the column which cannot be easily modified is a hidden column which cannot be directly accessed by a user or a database administrator.

In a variation on this embodiment, producing the encrypted value involves performing a one-way hash function on the data stored in the chosen columns to obtain a hash value.

In a further variation, producing the encrypted value involves communicating the hash value to an auditor process and subsequently receiving an encrypted hash value from the auditor process which is encrypted with an auditor key. In addition, storing the encrypted value in the column which cannot be easily modified involves storing the encrypted hash value in the column.

In a variation on this embodiment, the system receives a reference to one or more columns in a row within the table, and determines whether any of the referenced columns is among the protected columns.

In a further variation, if any of the referenced columns is among the protected columns, the system produces an encrypted value based on the data stored in the protected columns in the row, and evaluates the integrity of the data stored in the protected columns by comparing the produced encrypted value against the encrypted value stored in the column which cannot be easily modified.

In a further variation, producing the encrypted value involves performing a one-way hash function on the data stored in the protected columns to obtain a hash value.

In a further variation, producing the encrypted value involves communicating the hash value to an auditor process and subsequently receiving an encrypted hash value from the auditor process which is encrypted with an auditor key.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
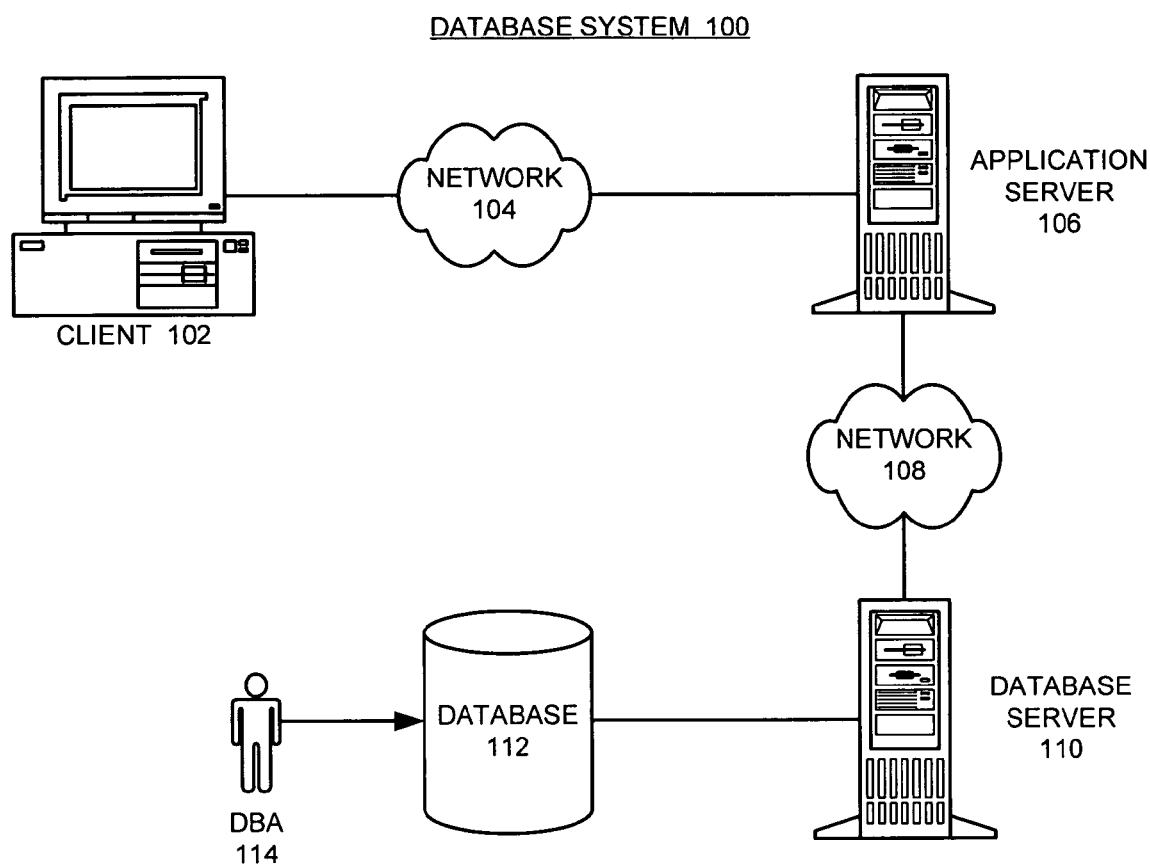
FIG. 1 illustrates a database system in accordance with an embodiment of the present invention.

FIG. 1 illustrates a database system in accordance with an embodiment of the present invention. Database system 100 includes client 102, application server 106, database server 110, database 112, and database administrator (DBA) 114. Client 102 is coupled to application server 106 across network 104, while database server 110 is coupled to application server 106 across network 108. Database 112 is coupled to database server 110.

Networks 104 and 108 can generally include any type of wire or wireless communication channel capable of coupling together computing nodes. This includes, but is not limited to, a local area network, a wide area network, or a combination of networks. In one embodiment of the present invention, networks 104 and 108 include the Internet. Network 108 can also be a private network. Note that in some configurations application server 106 and database server 110 are hosted by the same computer system.

Database 112 can include any type of system for storing data in non-volatile storage. This includes, but is not limited to, systems based upon magnetic, optical, and magneto-optical storage devices, as well as storage devices based on flash memory and/or battery-backed up memory.

Database administrator (DBA) 114 is responsible for the operation and maintenance of database 112, and typically has the privilege to modify data stored in the storage device.

Client 102 allows a user (not shown) to enter data through a user interface, such as a web browser. This data is sent to application server 106 across network 104. Application server 106 then forms a database query using the data supplied by client 102 and forwards this query to database server 110 across network 108. Database server 110 validates the query and, if valid, performs the requested operation on database 112.

Protecting Data from Unauthorized Modification

Figure 2:
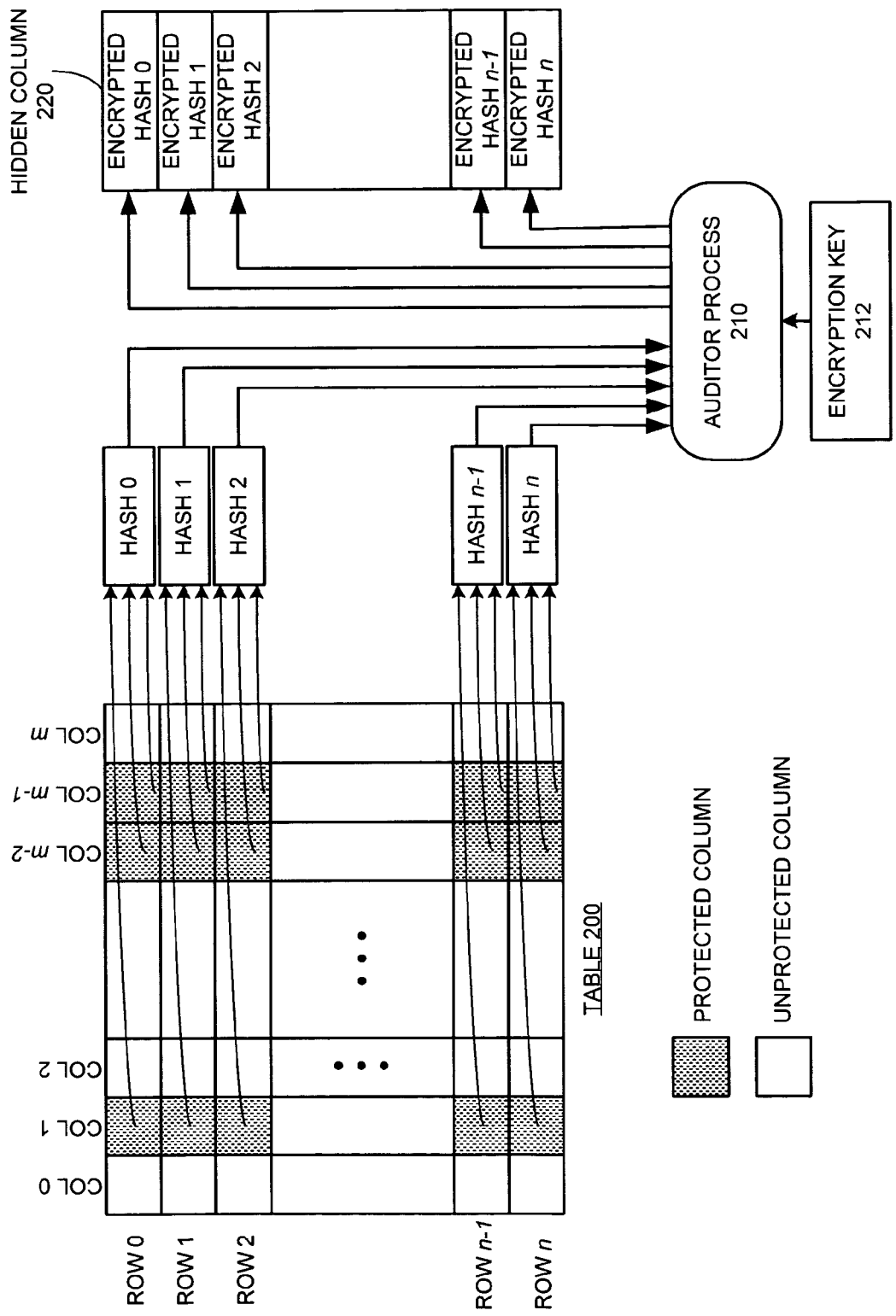
FIG. 2 illustrates the process of encrypting certain protected columns in a data table and storing the encrypted values in a hidden column in accordance with an embodiment of the present invention.

FIG. 2 illustrates the process of encrypting certain protected columns in a data table and storing the encrypted values in a hidden column in accordance with an embodiment of the present invention. Typically, data in a database is stored in a table structure, such as table 200. Rows in table 200, such as row 0, row 1, . . . , row n, represent records of data respectively. Within a given row, a number of columns, such as column 0, column 1, . . . , column m, represent different data fields. In some tables, specific columns within a row contain critical data, which should be protected against unauthorized tempering or modification.

One embodiment of the present invention protects one or more selected columns in a row against unauthorized modifications. This is accomplished as follows. An encrypted value is generated based on the data stored in the protected columns. This encrypted value is then stored in an additional column, which cannot be easily accessed. This additional column can be, for example, a "hidden column" which is not directly visible to users or database administrators. In this way, whenever a user selects or queries data stored in a protected column, the system can re-compute the encrypted value from the protected columns, and can compare the computed encrypted value with the one stored in the hidden column. If the two values match, the data stored in the protected column is authentic; otherwise, the data has been modified.

One approach to generate the encrypted value is to apply a one-way hash function to the protected columns. In some cases, the system may use an independent auditor process to further encrypt the hash value for additional security. Because the auditor process can reside at a different location, and because the encryption key used by the independent auditor process is beyond the reach of any administrative user of the database, this independent auditing process provides extra protection against unauthorized modification of the hash value.

In a system which uses an independent auditor process, the auditor process typically encrypts the received hash value with its own encryption key, and returns the encrypted hash value which is subsequently stored in the hidden column. When checking the integrity of the data, the system typically re-generates the hash value from the protected columns, and sends the hash value to the auditor process. The auditor process in turn encrypts the hash value and returns the encrypted value to the system. This encrypted value is then compared with the value stored in the hidden column to confirm the authenticity of the data.

As shown in FIG. 2, there are (n+1) rows and (m+1) columns in table 200. In this example, columns 1, (m−2), and (m−1) are protected. When each row is created, the data in the protected columns are first hashed to obtain a hash value. (Hash value 0, 1, . . . , n correspond to row 0, 1, . . . , n, respectively.) The hash value is then sent to an independent auditor process 210, which encrypts the hash value with its encryption key 212. The encrypted hash value is then returned to the table, and stored in a hidden column 220 which is associated with table 200. Note that, although hidden column 220 illustrated in FIG. 2 is separate from table 200, there is nothing to prevent one from implementing the hidden column as a part of table 200.

Managing a Data Table with Protected Columns

Figure 3:
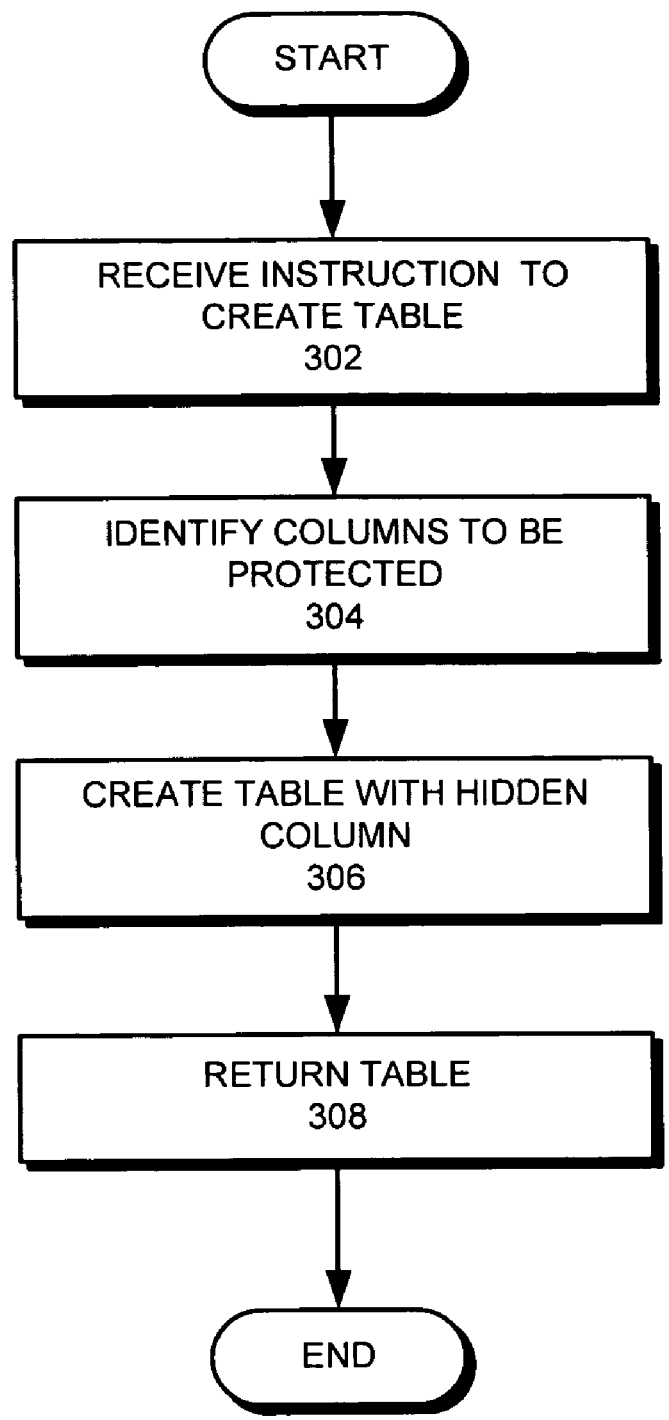
FIG. 3 presents a flowchart illustrating the process of creating a data table with a hidden column for data protection in accordance with an embodiment of the present invention.

FIG. 3 presents a flowchart illustrating the process of creating a data table with a hidden column for data protection in accordance with an embodiment of the present invention. During operation, the system starts by receiving an instruction to create a table with protected columns (step 302). After parsing the instruction, the system identifies the columns to be protected (step 304). The system then creates a data table with a hidden column which stores the encrypted value to be derived based on the protected columns (step 306). Next, the system returns the created table (step 308).

Figure 4:
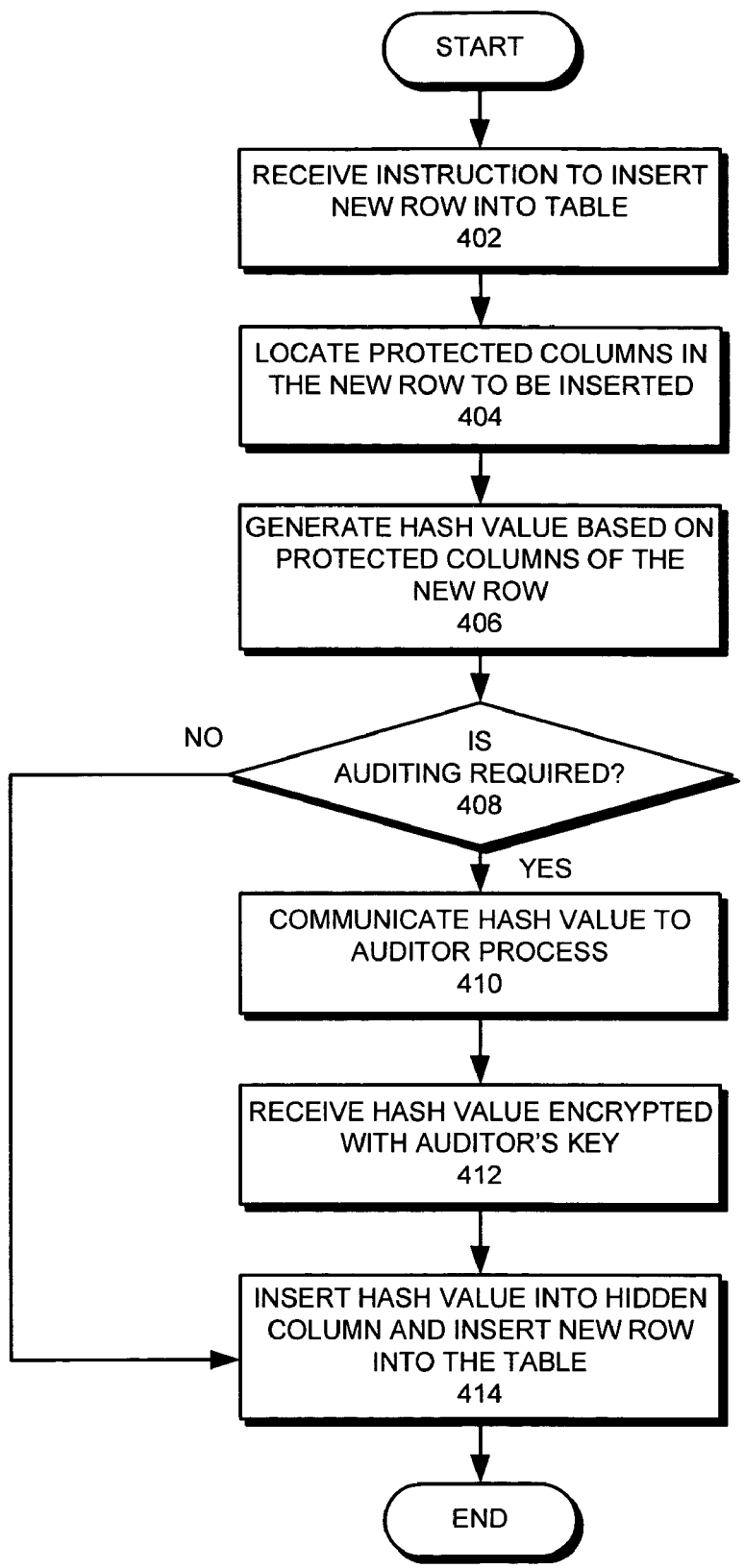
FIG. 4 presents a flowchart illustrating the process of inserting a new row into a data table with a hidden column for data protection in accordance with an embodiment of the present invention.

FIG. 4 presents a flowchart illustrating the process of inserting a new row into a data table with a hidden column for data protection in accordance with an embodiment of the present invention. During operation, the system starts by receiving an instruction to insert a new row into the table (step 402). The system then locates the protected columns in the new row to be inserted (step 404). Next, the system generates a hash value based on the protected columns of the new row (step 406).

The system subsequently determines whether independent auditing is required for the hash value (step 408). If not, the system inserts the hash value into the hidden column and inserts the new row into the table (step 414). If auditing is required, the system communicates the hash value to an auditor process (step 410). The system then receives from the auditor process the hash value encrypted with the auditor's encryption key (step 412). Next, the system inserts the encrypted hash value into the hidden column and inserts the new row into the table (step 414).

Figure 5:
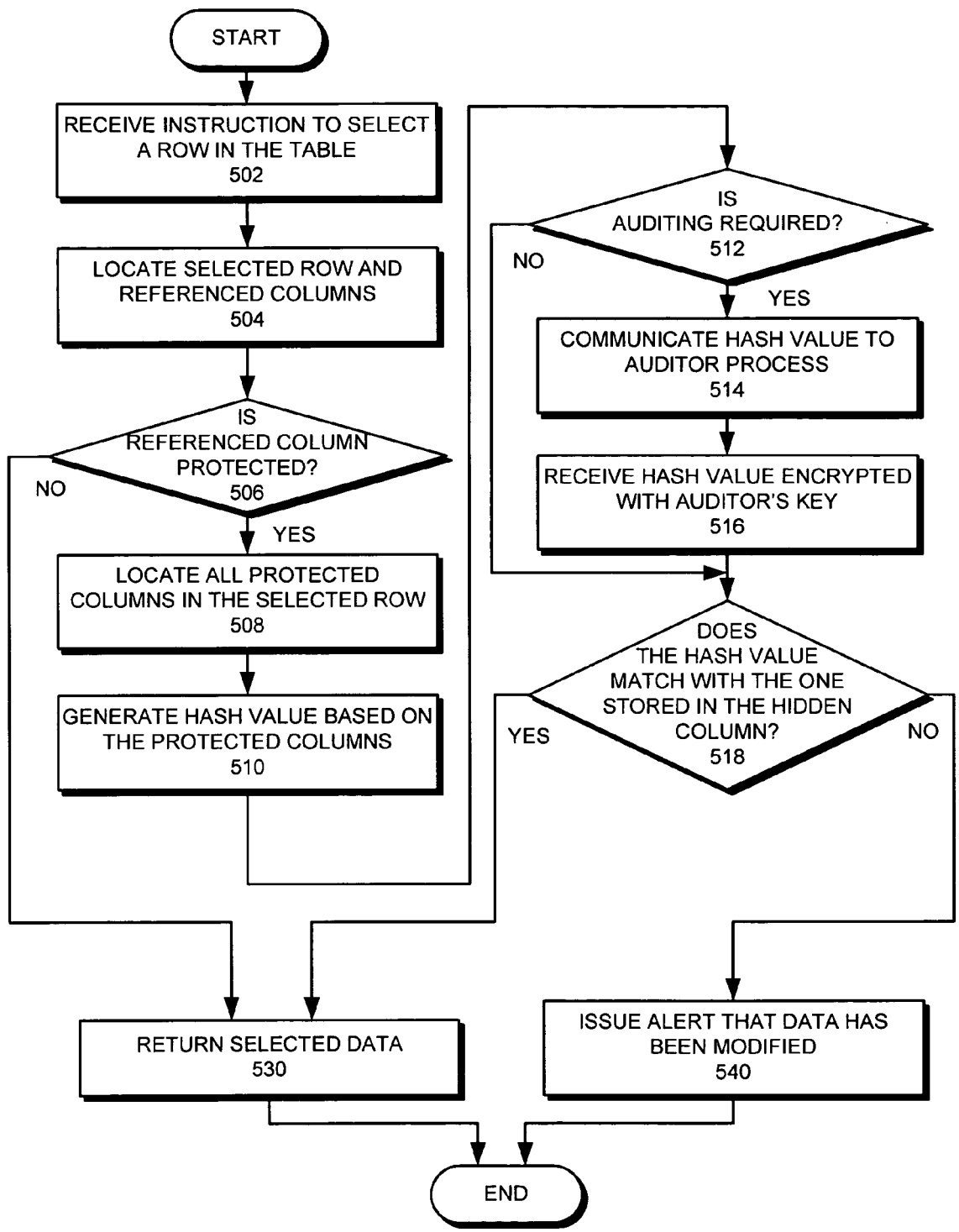
FIG. 5 presents a flowchart illustrating the process of selecting data from a data table with a hidden column for data protection in accordance with an embodiment of the present invention.

FIG. 5 presents a flowchart illustrating the process of selecting data from a data table with a hidden column for data protection in accordance with an embodiment of the present invention. During operation, the system starts by receiving an instruction to select a row in the table (step 502). After parsing the instruction, the system locates the selected row and one or more referenced columns within that row (step 504).

The system subsequently determines whether any of the referenced columns is protected (step 506). If none of the referenced columns is protected, the system returns the selected data (step 530). Otherwise, the system locates all the protected columns in the selected row (step 508), and generates a hash value based on these protected columns (step 510).

The system then determines whether auditing is required (step 512). If not, the system compares the hash value with the hash value stored in the hidden column which corresponds to the selected row (step 518). If auditing is required, the system then communicates the hash value to an auditor process (step 514). Next, the system receives the hash value encrypted with the auditor's encryption key (step 516).

After receiving the encrypted hash value from the auditor process, the system compares it with the encrypted value stored in the hidden column which corresponds to the selected row (step 518). If the two values match, the data stored in the referenced columns is authentic, and the system proceeds to return the selected data (step 530). Otherwise, the data stored in at least one of the referenced columns has been modified without authorization, and the system issues an alert (step 540).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for protecting data from unauthorized modification in a table, wherein the table contains at least three rows, and wherein each row contains at least three columns, the method comprising:
   choosing in a row one or more columns to be protected;
   producing an irreversible one-way hash value for the row based on the data stored in the chosen columns;
   communicating the one-way hash value to an auditor process;
   receiving an encrypted one-way hash value, which is encrypted with an auditor key, from the auditor process; and
   storing the encrypted one-way hash value in a column which is not directly visible to a user or a database administrator, whereby a later-produced encrypted value generated from the values in the protected columns can be compared against the previously stored encrypted one-way hash value to verify the integrity of the data stored in the protected columns.

2. The method of claim 1, further comprising:
   receiving a reference to one or more columns in a row within the table; and
   determining whether any of the referenced columns is among the protected columns.

3. The method of claim 2, wherein if any of the referenced columns is among the protected columns, the method further comprises:
   producing an encrypted value based on the data stored in the protected columns in the row; and
   evaluating the integrity of the data stored in the protected columns by comparing the produced encrypted value against the encrypted value stored in the column which cannot be easily modified.

4. The method of claim 3, wherein producing the encrypted value involves performing a one-way hash function on the data stored in the protected columns to obtain a hash value.

5. The method of claim 4, wherein producing the encrypted value involves communicating the hash value to an auditor process and subsequently receiving an encrypted hash value from the auditor process which is encrypted with an auditor key.

6. A computer-readable storage medium storing instructions that when executed by a computer cause the computer to perform a method for protecting data from unauthorized modification in a table, wherein the table contains at least three row, and wherein each row contains at least three columns, the method comprising:
   choosing in a row one or more columns to be protected;
   producing an irreversible one-way hash value for the row based on the data stored in the chosen columns;
   communicating the one-way hash value to an auditor process;
   receiving an encrypted one-way hash value, which is encrypted with an auditor key, from the auditor process; and
   storing the encrypted one-way value in a column which is not directly visible to a user or a database administrator, whereby a later-produced encrypted value generated from the values in the protected columns can be compared against the previously stored encrypted one-way hash value to verify the integrity of the data stored in the protected columns.

7. The computer-readable storage device of claim 6, wherein the method further comprises:
   receiving a reference to one or more columns in a row within the table; and
   determining whether any of the referenced columns is among the protected columns.

8. The computer-readable storage device of claim 7, wherein if any of the referenced columns is among the protected columns, the method further comprises:
   producing an encrypted value based on the data stored in the protected columns in the row; and
   evaluating the integrity of the data stored in the protected columns by comparing the produced encrypted value against the encrypted value stored in the column which cannot be easily modified.

9. The computer-readable storage device of claim 8, wherein producing the encrypted value involves performing a one-way hash function on the data stored in the protected columns to obtain a hash value.

10. The computer-readable storage device of claim 9, wherein producing the encrypted value involves communicating the hash value to an auditor process and subsequently receiving an encrypted hash value from the auditor process which is encrypted with an auditor key.

11. An apparatus for protecting data from unauthorized modification, comprising:
   a processor;
   a memory;
   a table, wherein
      the table contains at least three rows;
      each row contains at least three columns; and
      wherein the table contains one column which is not directly visible to a user or a database administrator;
   a selection mechanism configured to choose in a row one or more columns to be protected;
   an encryption mechanism configured to:
      produce an irreversible one-way hash value for the row based on the data stored in the chosen columns and encrypt the one-way hash value;
      communicate the one-way hash value to an auditor process; and receive an encrypted one-way hash value, which is encrypted with an auditor key, from the auditor process; and a storage mechanism configured to store the encrypted one-way value in the column which is not directly visible to a user or a database administrator, whereby a later-produced encrypted value generated from the values in the protected columns can be compared against the previously stored encrypted one-way hash value to verify the integrity of the data stored in the protected columns.

12. The apparatus of claim 11, further comprising:

a receiving mechanism configured to receive a reference to one or more columns in a row within the table; and a determination mechanism configured to determine whether any of the referenced columns is among the protected columns.

13. The apparatus of claim 12, wherein if any of the referenced columns is among the protected columns, the encryption mechanism is further configured to produce a encrypted value based on the data stored in the protected columns in the row; and wherein the apparatus further comprises an evaluation mechanism configured to evaluate the integrity of the data stored in the protected columns by comparing the produced encrypted value against the encrypted value stored in the column which cannot be easily modified.

14. The apparatus of claim 13, wherein while producing the encrypted value, the encryption mechanism is configured to perform a one-way hash function on the data stored in the protected columns to obtain a hash value.

15. The apparatus of claim 14, wherein while producing the encrypted value, the encryption mechanism is configured to communicate the hash value to an auditor process and to subsequently receive an encrypted hash value from the auditor process which is encrypted with an auditor key.

* * * * *

UNITED STATES PATENT AND TRADEMARK OFFICE
CERTIFICATE OF CORRECTION

| | | |
|---|---|---|
| PATENT NO. | : 7,571,490 B2 | Page 1 of 1 |
| APPLICATION NO. | : 10/979691 | |
| DATED | : August 4, 2009 | |
| INVENTOR(S) | : Daniel ManHung Wong | |

It is certified that error appears in the above-identified patent and that said Letters Patent is hereby corrected as shown below:

In column 6, line 6, in claim 6, delete "medium" and insert -- device --, therefor.

In column 6, line 10, in claim 6, delete "row," and insert -- rows, --, therefor.

Signed and Sealed this

Twenty-ninth Day of June, 2010

David J. Kappos
*Director of the United States Patent and Trademark Office*